Dec. 19, 1933.  H. ROSENTHAL  1,940,327
FOOD CHOPPER
Filed May 12, 1931
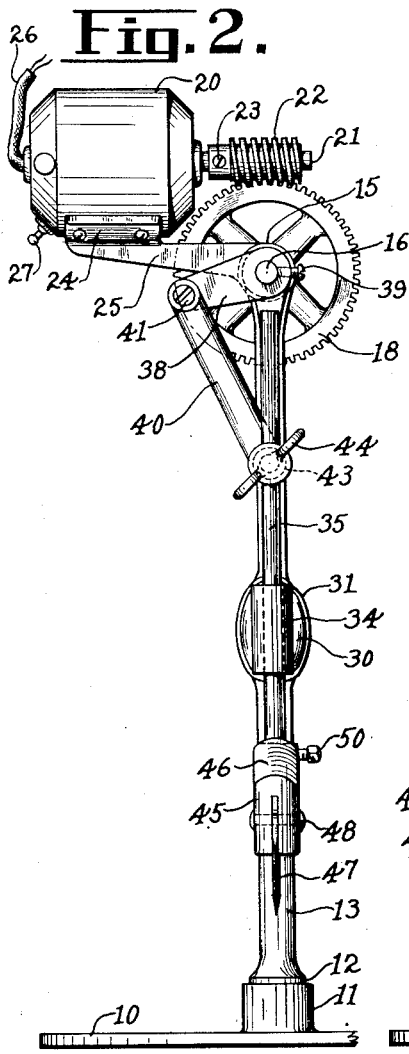
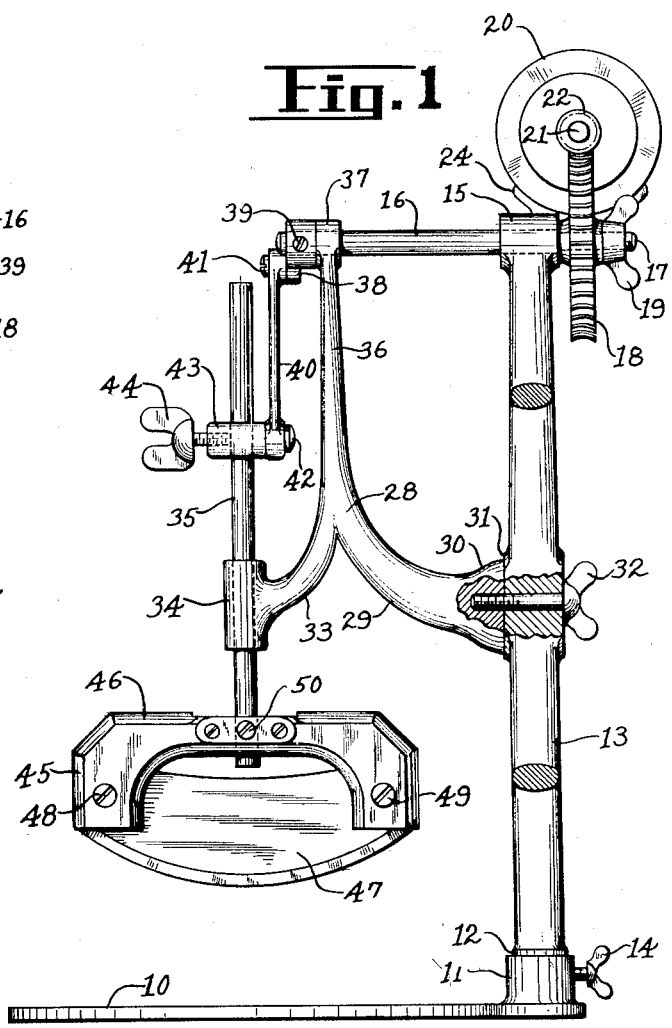
INVENTOR
Herman Rosenthal.
BY HIS ATTORNEY
H. G. Manning Patented Dec. 19, 1933

1,940,327

UNITED STATES PATENT OFFICE 1,940,327

FOOD CHOPPER

Herman Rosenthal, Ansonia, Conn.

Application May 12, 1931. Serial No. 536,723

1 Claim. (Cl. 146—69)

This invention relates to food choppers, and more particularly to a power-driven food chopper especially adapted for domestic purposes.

One object of this invention is to provide a food chopper of the above nature which will automatically slice or cut up into small pieces fish, meat, or any other culinary foods to be prepared for the table.

A further object is to provide a power-driven adjustable reciprocating device which will be adapted to perform many of the manual tasks of the kitchen, said device having means for interchangeably receiving various food-preparing implements, such as egg beaters, cream whippers, choppers, slicers, stirrers, churns, mashers, etc.

A further object is to provide a device of the above nature which will be simple in construction, inexpensive to manufacture, easy to assemble and manipulate, light in weight, portable, compact, ornamental in appearance, and very efficient and durable in use.

With these and other objects in view there has been illustrated on the accompanying drawing, one form in which the invention may be conveniently embodied in practice.

In the drawing:

Fig. 1 represents a front elevation, partly in section, of a food chopper embodying the invention.

Fig. 2 is an end view of the same.

Referring now to the drawing in which like reference numerals denote corresponding parts throughout the several views, the food chopper, as herein disclosed, is supported by a large circular base plate 10. The base plate 10 has an upstanding hollow vertical boss 11 within which the lower end 12 of a vertical standard 13 is detachably secured, as by a winged screw 14. The vertical standard 13 carries at its upper end a horizontal hollow boss 15 having journaled therein a drive shaft 16, the rear end of which is reduced at 17 for receiving a worm gear 18 which is locked thereon by means of a winged nut 19 for rigidly clamping said gear 18 against the shoulder at the extremity of said reduced end 17.

Power for driving the chopping device is supplied by an electric motor 20 having an armature shaft 21 to which is secured a worm pinion 22 meshing with said worm gear 18, the latter being secured as by a set screw 23. The motor 20 is fixedly supported upon a curved shelf 24 of a bracket 25 integral with the horizontal boss 15 and extending laterally therefrom. The motor 20 is supplied with electricity through a conductor cable 26 and is adapted to be controlled by a toggle switch lever 27.

The vertical standard 13 is provided intermediate of its length with an inverted bifurcated bracket 28, the rear arm 29 of which is formed with an enlarged horizontal boss 30 adapted to abut against a shoulder pad 31 on said standard 13. The bracket 28 is adapted to be locked in position against said pad 31 by means of a winged set screw 32. This construction permits the device to be readily assembled and disassembled for convenience in storage or shipment.

The front arm 33 of the bifurcated bracket 28 carries upon its end a vertical hollow boss 34 adapted to form a sliding bearing for a reciprocating implement-holding shaft 35.

In order to form a journal for the front end of the drive shaft 16, the upper arm 36 of the bifurcated bracket 28 carries a hollow horizontal boss 37. For the purpose of converting the continuous rotary motion of the horizontal drive shaft 16 into the reciprocating motion of said vertical sliding shaft 35, a crank arm 38 is rigidly connected, as by a set screw 39, to the front end of said drive shaft adjacent the boss 37. The crank arm 38 is connected at its outer end to a pitman rod 40 by a pivot screw stud 41, the lower end of said pitman rod 40 being journaled on the reduced end 42 of a sliding block 43. The block 43 is held in any desired adjusted position upon the vertical shaft 35 by means of a winged set screw 44.

To the lower end of the reciprocating shaft 35 is detachably held a chopping implement 45, herein disclosed as comprising a U-shaped slotted bracket 46 and a curved cutting blade 47, said blade being clamped to said bracket by a pair of attaching screws 48 and 49, said bracket being adjustably locked upon said vertical shaft 35, as by a set screw 50.

Operation

When it is desired to use the food chopper, it will only be necessary to throw the toggle switch lever 27 to the "on" position. The motor 20 will then rotate the drive shaft 16, which in turn will reciprocate the vertical shaft 35 by means of the crank arm 38 and connecting pitman rod 40. A bowl or dish, not shown, containing the materials to be chopped may then be placed under the cutter blade 42 and left there as long as desired.

It is to be understood that whereas the invention has been herein disclosed for operating a chopping knife, other implements may be substituted therefor to perform the various functions already stated in the aforesaid objects of the invention.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claim.

Having thus fully described the invention, what is claimed as new and for which it is desired to secure Letters Patent, is:

In a food chopper, a base, a vertical standard supported thereby, a three-arm bifurcated bracket having an upper vertical arm and a pair of outwardly inclined lower arms, one of said lower arms being connected to said standard, the other lower arm forming a journal for a vertical chopper-holding rod, said standard having a boss at its upper end having a side extension for supporting a driving motor, said boss and said upper arm forming journals for a horizontal drive-shaft, means for operatively connecting said drive-shaft with said motor, and means connected with said drive-shaft and said chopper-holding rod for vertically reciprocating the latter.

HERMAN ROSENTHAL.